P. B. LAIDLAW.
POULTRY HOUSE AND PEN.
APPLICATION FILED DEC. 4, 1911.
1,070,819.
Patented Aug. 19, 1913.
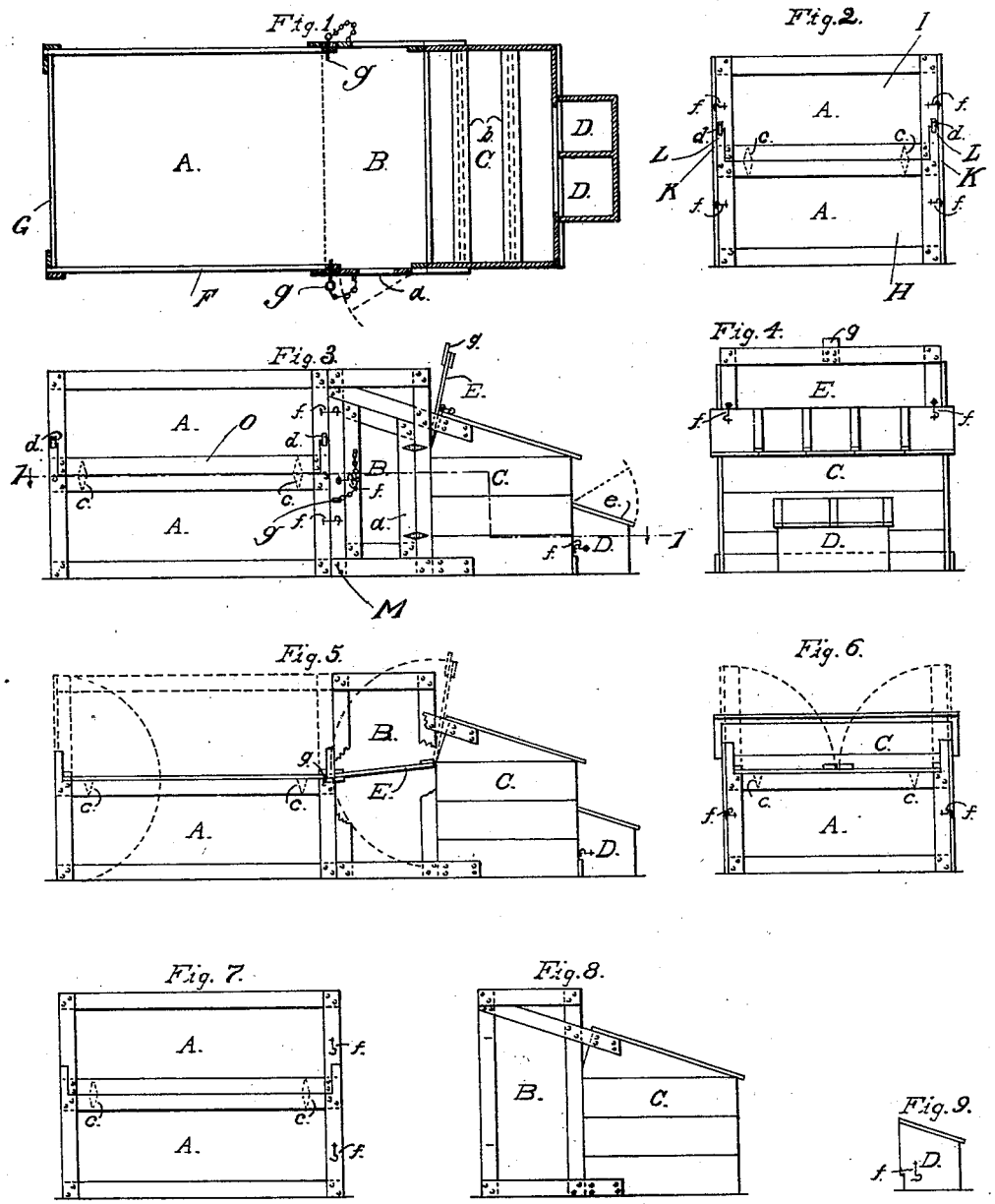

UNITED STATES PATENT OFFICE.

PETER B. LAIDLAW, OF EL PASO, TEXAS.

POULTRY HOUSE AND PEN.

1,070,819.  Specification of Letters Patent.  Patented Aug. 19, 1913.

Application filed December 4, 1911. Serial No. 663,790.

*To all whom it may concern:*

Be it known that I, PETER B. LAIDLAW, a citizen of the United States, residing at El Paso, in the county of El Paso and State of Texas, have invented an Improved Poultry House and Pen.

My invention relates to improvements in poultry houses and pens, and has especial reference to poultry houses adapted to the raising of young chickens, and has for its object the construction of a poultry house and pen, so constructed as to afford every possible advantage for the housing of poultry.

A further object is to provide a runway or pen for the poultry which is adjustable in height.

A further object is to provide a poultry house or pen possessing advantages in point of simplicity and inexpensiveness.

Referring to the drawings, wherein similar reference letters designate similar parts herein shown: Figure 1 is a horizontal sectional view taken along line 1—1 of Fig. 3; Fig. 2 is a side elevation of one of the removable pen sections at its full height, the top sections being raised; Fig. 3 is a side elevation of the entire poultry house or pen, with the sides of the pen at their full length, and the door of the house open, allowing the poultry access to the pen. Fig. 4 is a rear elevation; Fig. 5 is a side view taken on Fig. 3; Fig. 6 is a front view of Fig. 5; Figs. 7, 8, and 9 are side views of the pen, house, and nest boxes, respectively, shown in separated relation.

My invention comprises in its main features, the house or covered portion C, the pen A, the space B, between the house C and the pen A, and the nest boxes D. The house or main portion C is provided at its front with a flap door E, adapted to swing up and back into the position shown in Fig. 3. Roosts $b$, of the usual type are provided within the house C. At the rear of house C, and communicating therewith are a plurality of inclosed nest boxes D, provided with flap doors $e$, upon their upper portions. Between the pen A and the house C, is a space B, provided with a door $a$, for entry into the house and pen.

Adjoining the space B, and communicating therewith, is the pen A, composed of the two removable side sections F F, and the removable end section G. These sections are each constructed of two rectangular sections H, I, hingedly connected at $c\ c$. The lower section H has projections K K, fitting into cut out portions L L, in the upper section I. These projections abut against the lower bar O, of the upper movable section I, thus preventing any reverse movement of the top sections. Pivoted fastening elements $d\ d$ are provided to lock the projections K K into the cut out portions L L, whereby the two hinged sections are held in the same vertical plane. This construction is the same in all three of the pen sections.

As shown in Figs. 7, 8, and 9, the pen, house, and nest boxes are removably attached to each other by means of the hooks $f$. The pen sections are also removably attached to each other by means of hooks $f$.

In the forward uprights M, of the space B, are placed removable pins $g$, which project into the space B, and which form a support for the outer edge of door E, when in the position as shown in Fig. 5.

When it is desired to form a covered pen, the fasteners $d$ are turned to allow the top sections I to fold down as shown by the dotted lines in Figs. 5 and 6. The top section of the end section $b$ is folded completely down, as shown in dotted lines in Fig. 5. Upon the edge of door E, is formed a ledge $g$, upon which the top section of the side sections rest when folded down. The top sections, when folded down, completely cover and form a roof for the pen A. This construction is shown in Figs. 5 and 6. When it is desired to again have the open pen construction, the top sections are raised and locked into position by means of the fasteners $d$, and the hook $f$, the pins $g$, are removed, and the door E left free to swing along the dotted lines shown in Fig. 5.

Preferably, and as above shown, the sections are rectangular frames covered with wire mesh, and the house and nest boxes are solid panels, but it is manifest that changes might be resorted to without departing from the spirit of the invention, and I do not restrict myself to the details as set forth, but consider myself at liberty to make such changes as fall within the scope of the appended claims.

What I claim and desire to secure by Letters Patent, is:

1. In combination, a nest box, a house section adjacent the nest box, detachable means for connecting the nest box to the house section, a frame extending from the house section, a pen comprising lower stationary sections, upper movable sections hinged to the stationary sections, two of said hinged sections adapted to be folded in a horizontal position to form a roof for the pen, a flap door hinged between the house section and the pen, and forming, when closed, a top between the pen and house section and a continuation of the roof formed by the movable sections, means for supporting the movable sections and the flap door to form a closed pen.

2. In combination, a nest box, a house section adjacent the nest box, a frame extending from the house section, a pen section adjacent the frame, said pen comprising lower stationary sections, upper movable sections hinged to the stationary sections, said stationary sections having extensions thereon, the movable sections having cut out portions to receive the extensions, and fastening devices on the movable sections to coöperate with the extensions whereby to hold the movable sections in vertical position to provide an open top pen.

3. In combination, a nest box, a house section adjacent thereto, a frame extending from the house section, a pen adjacent the frame, comprising removable sections, said sections comprising lower stationary sections and upper movable sections hinged thereto, a flap door on the house section, means for holding said door in a horizontal position, and means on said door to support the upper movable pen sections when in a horizontal position.

PETER B. LAIDLAW.

Witnesses:
 JOHN R. BLAIR,
 J. A. MOORE.

---

Copies of this patent may be obtained for five cents each, by addressing the "Commissioner of Patents, Washington, D. C."